May 7, 1963

N. REIS ET AL 3,089,019

ELECTRIC ARC WELDING APPARATUS

Filed Dec. 23, 1960

INVENTORS
NORMAN REIS
ROBERT L. HACKMAN

BY Barnwell R. King
ATTORNEY

INVENTORS
NORMAN REIS
ROBERT L. HACKMAN
BY Barnwell R. King
ATTORNEY

3,089,019
ELECTRIC ARC WELDING APPARATUS
Norman Reis, Fords, and Robert L. Hackman, Morris Plains, N.J., assignors to Union Carbide Corporation, a corporation of New York
Filed Dec. 23, 1960, Ser. No. 78,051
6 Claims. (Cl. 219—75)

This invention relates to gas shielded non-consumable electrode electric arc welding, and more particularly to work-in-circuit welding with torches provided with a "probe" or pilot arc electrode in addition to the main electrode.

According to the invention there is provided a torch having a pilot arc electrode that is located wholly within the gas cup with its arcing end disposed as closely as possible to the main electrode to improve cleaning action of the process.

As originally conceived, the stabilizing current of the A.C. inert gas shielded non-consumable electrode arc welding process used a metallic cup or nozzle as the positive electrode in the pilot arc circuit. To provide better shielding, visibility, and puddle control, it was desirable to incline the torch at an angle such that the electrode tended to point in the direction of weld progression. With a typical leading angle of the torch the stabilization impulse tending to jump in the trailing region, dragging the reverse polarity component of the welding arc with it. Resulting cleaning action of the arc was erratic and tended to trail rather than lead the puddle. This difficulty was further compounded when the cup touched the work particularly in fillets, since the stabilization circuit was shorted out and essentially complete rectification took place.

The cup could not be incorporated as part of the circuit or else alternate circuitry had to be found. Much experimentation indicated several circuit variations but they too suffered similar limitations as the original circuit.

Existing systems of A.C. stabilization of the welding arc with the exception of pilot arc stabilization as disclosed in Miller Patent No. 2,892,072, and Sullivan application Serial No. 801,787, filed March 25, 1958 (now Patent No. 2,993,984, dated July 25, 1961), have one characteristic in common, namely, they rely on injection of the high voltage reignition pulse by either a parallel connection between the welding electrode and the work, or a series connection in the welding circuit. Thus, the welding action and the stabilizing method both use the same two electrodes (the welding electrode and the work) for their introduction. Such two-electrode system is by definition a diode.

The pilot arc stabilization systems disclosed by Miller, as well as by Sullivan, and in the present case, are by definition triode systems, in that the welding action and the stabilizing action utilize the work in common as an electrode; but perform their particular functions with respect to the work from separate and substantially isolated electrodes. As between the diode and triode systems, it can be considered that no change of substance has been made in the work electrode nor in the welding electrode. However, the significance of the physical configuration of the third element as in the triode (pilot arc electrode) has not been fully recognized in the past for its effect in obtaining desirable, stable, and omnidirectional cleaning action in the welding operation.

The associated triode circuitry with which the invention described herein can function has been previously disclosed by Miller in Patent No. 2,892,072 and in Sullivan application Serial No. 801,787 (FIG. 5). It is desired to provide a torch, as hereinafter described, capable of being incorporated into said circuits such that the cleaning action of reverse polarity of the A.C. welding cycle which was random (not necessarily oriented to provide cleaning action ahead of the torch action) is now virtually controlled to provide uniform cleaning pattern.

Another object is to provide means for utilizing inductive kick starting for the pilot arc as disclosed in Manz application Serial No. 36,941, filed June 17, 1960, now Patent No. 3,051,829, wherein no two points of equal potential exist in the starting circuit; and further to provide more practical means to practice that feature of Gage Patent No. 2,802,093 which covers the use of pilot arc for arc ignition of either an A.C. or D.C. arc.

However, the principal object of the invention is to eliminate any adverse effect of torch angle on the cleaning action in seam welding.

Another object is to minimize any adverse effect of a pilot arc electrode wholly within a gas cup on the flow of gas therethrough which might result in oxidation of much of the pilot arc electrode due to turbulence leading to aspiration of air.

The invention provides in a triode inert gas shielded non-consumable electrode alternating current electric arc welding system comprising a torch provided with a gas cup and a pilot arc electrode in addition to the main electrode, said pilot arc electrode being carried wholly within such cup by said torch with one end spaced from but adjacent to the arc end of said main electrode, means electrically isolating such gas cup from said pilot arc electrode as well as from said main electrode, means for connecting said main electrode and a metal workpiece in an alternating current welding arc energizing circuit, and means for connecting said pilot arc electrode and said main electrode in a pilot arc energizing circuit, the pilot-arc arcing portion of said pilot arc electrode being as close as possible to said main electrode but spaced therefrom whereby undesirable trailing of cleaning action is avoided even when the torch is tilted away from the direction of movement of the torch in making a weld bead on the metal workpiece in circuit with such main electrode.

Figure 1:
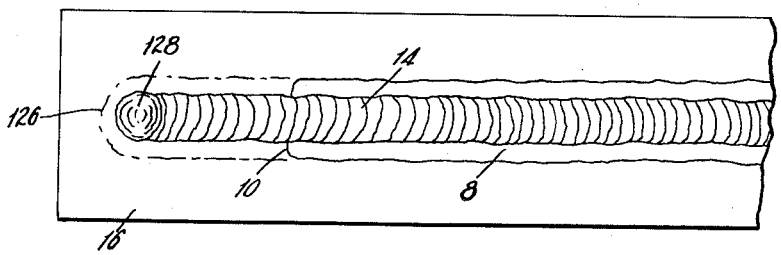
FIG. 1 is a plan view of a weld illustrating the effect of cleaning action before and after the invention.
Figure 2:
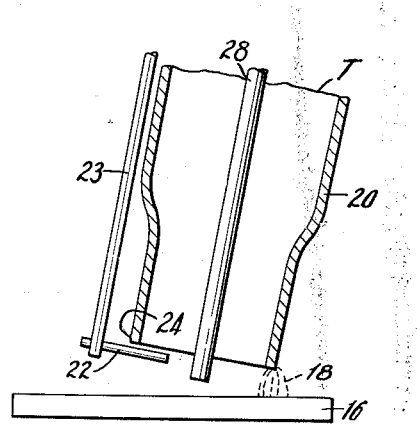
FIG. 2 is a fragmentary view partly in side elevation and partly in section of a torch in use illustrating the effect of the position of the torch parts on cleaning action.

As shown in FIG. 1, the area 8 due to cleaning action i.e. cathodic sputtering extended only to limit 10 when cup 20, FIG. 2 moved in the right-to-left direction in making weld bead 14 on metal plate 16, due to the stabilizing arc 18 jumping from the trailing edge of cylindrical cup 20 to the plate 16 in the trailing region of the tilted torch T, according to the prior art.

We have discovered that the effect of the such torch angle upon the cleaning action can be eliminated by removing metallic cup 20 from the electrical circuit, inserting a pilot electrode 22 in the circuit, and locating it approximately at the leading edge 24 of the gas cup by a supporting rod 23. The stabilizing effect was observed to be localized and preceded the welding action; thus, provide cleaning action to limit 126 ahead of the weld puddle area 128, FIG. 1. Such arrangement thus provides simple means for establishing proper cleaning without deliberately considering either the criticalness of the leading angle of the torch, or the relative size of the trailing gap between the cup and work gap. The electrode 22 preferably is composed of a metallic substance (tungsten) capable of withstanding temperatures in excess of 3000 degs. F.

Still another means for obtaining the desired cleaning action is accomplished by removing the metallic cup 20 from the circuit and disposing the pilot arc electrode in the form of a hollow metallic sleeve 26 in spaced concentric relationship about the main welding electrode 28. Such sleeve 26 is supported wholly within cup 20 by a bracket 27 mounted within the cylindrical cup 20 and electrically isolated from such cup 20. Tubular probe 26 is arranged sufficiently close to the stick electrode 28, or in other words, is small enough in diameter that the extent that the pilot arc (between the electrode 28 and tube 26) can deviate from the ideal or leading position, is limited to the internal diameter of the tubular electrode 26. The tubular probe or sleeve 26 is made of any suitable heat resistant material, such as tungsten.

Figure 6:
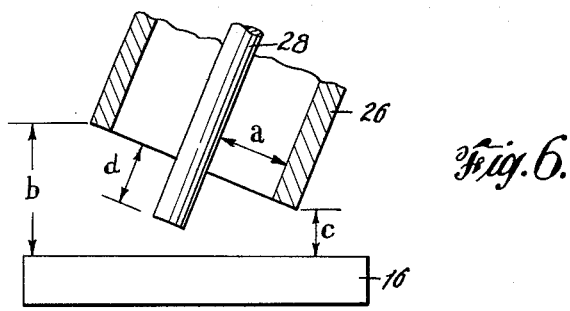
FIG. 6 is a fragmentary view partly in side elevation and partly in cross-section of part of the torch shown in FIG. 3, showing the angles referred to in the specification below.

Referring to FIG. 6, the ideal dimensional ratio between space $c$ and space $b$ should approach a value of one. This is necessary so that the stabilizing effect does not preferentially choose one point on the circumference of the tubular probe 26 where the voltage gradient to the work 16 would be appreciably larger than at other selected points. This can be accomplished by either, or a combination of two other dimensional considerations.

For example, if dimension $d$ is increased, the ratio $c:b$ tends to a value of one, conversely decreasing the dimension $d$ will increase the $c:b$ relationship, and thus tend toward a value much greater than one. From practical considerations, experiments have indicated that dimension $d$ can not become excessively large or else the stabilizing effect is highly attenuated or completely lost.

Alternatively, dimension $a$ can be decreased to cause the ratio $c:b$ to tend to the ideal value of one. Increasing dimension $a$, conversely will increase the $c:b$ value, thus departing from the ideal of one. In practice, experiments have shown that dimension $a$ should be sufficiently large to allow for possible eccentricities in practical apparatus and to minimize heat absorption from the welding electrode 28. Nevertheless, dimension $a$ should not be made too large, because the amount of current sufficient to maintain the pilot arc becomes excessively great. Therefore, the relationship of $a:d$ as it affects $c:b$ is selected to provide the best practical combination of effects.

Using this method, experiments have revealed that for all practical purposes, no difference in voltage gradient between dimensions $c$ and $b$ appears to exist, since the pilot arc emanated from any point on the periphery of the tubular probe 26 without any noticeable effect on the resultant cleaning pattern. Therefore, it is concluded that when an ideal relationship exists between dimensions $a$ and $d$ as they affect dimensions $c$ and $b$, any point on the periphery of the tubular probe 26 will be satisfactory.

Figure 7:
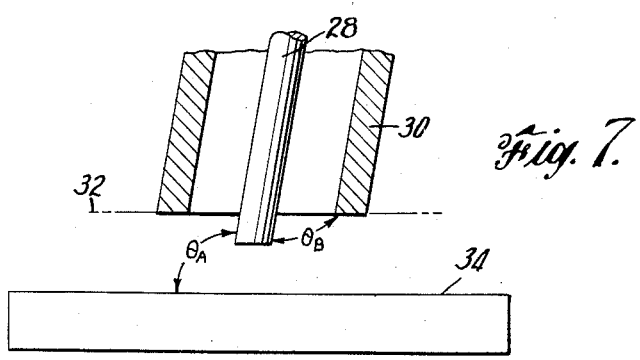
FIG. 7 is a similar view of a modification of the invention.

Furthermore, additional experimentation revealed that if a particular inclination of the torch axis to work surface is established, namely angle A; as in FIG. 7, the problem of maintaining the ideal $c:b$ relationship can be essentially disregarded by truncating a cylindrical section so that dimensions $b$ and $c$ are equal. The angle B about which the sleeve 30 is truncated is the angle between the torch electrode 28 and the plane 32 which truncates the tubular probe 30; and this plane is parallel to the plane of the surface 34 to be welded. In other words, angles $A=B$, by virtue of the well known fact that alternate interior angles, are equal.

Experiments have proved that such reasoning is valid, since the angle of torch inclination A in practice is relatively limited. Should the torch be inclined in the opposite direction, the tendency exists to approach the very difficulty which was sought to be overcome. Obviously, the truncated tubular probe 30 could be rotated about the main welding electrode 28 so that A angle approximately equals angle B. However, this would seriously detract from the flexible utility of a manual welding torch. In effect, with a given rotational position of the tubular probe 30 relative to the torch (with is assymetric in its design) the tendency exists for the torch to be either right-handed or left-handed.

Figure 4:
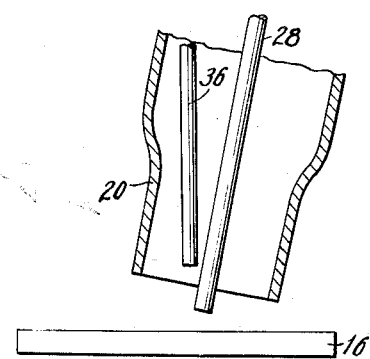

Still another and preferred means for obtaining improved cleaning action is obtained by arranging wholly within the cup 20, a single stick electrode 36, FIG. 4, inclined relative to the welding electrode 28 so that the generation of its inclined longitudinal axis about the longitudinal axis of the welding electrode 28 generates an annulus about such stick electrode 28 of the same diameter and relative position as the arcing end of the tubular electrode.

Figure 5:
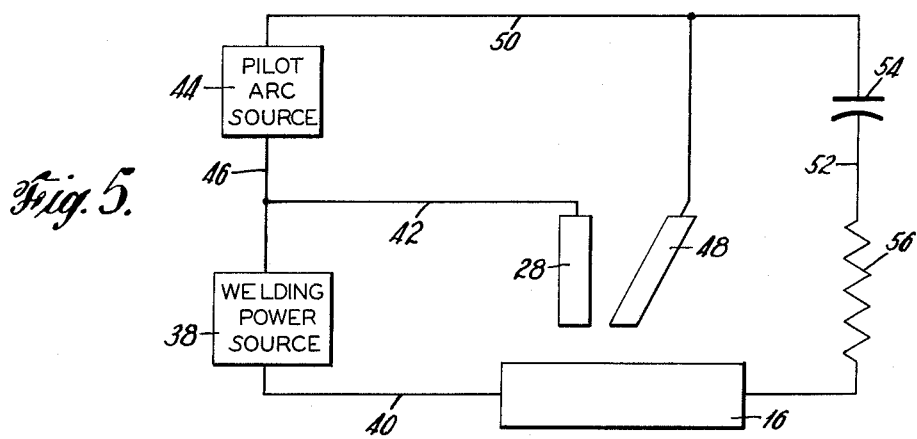
FIG. 5 is a circuit diagram of a triode welding system.

As shown in FIG. 5, welding power source 38 is connected by ground and torch leads 40 and 42, respectively, to the work 16 and electrode 28. Pilot arc power source 44 is connected to the negative side of such welding system by conductor 46, and to the pilot arc electrode 48 by a conductor 50. An RC circuit 52 provided with a capacitor 54 and a resistor 56, is connected to the pilot arc electrode 48 and work 16, respectively.

In practice, a pilot arc is initiated by shorting a piece of tungsten between the pilot arc electrode and the main welding electrode 28. Alternately, the pilot arc can be established by a scratch starting 11, i.e., by touching the welding electrode 28 to the workpiece 16. In the former method, the operator must have at his disposal, a small piece of tungsten rod which may easily be misplaced, while in the latter case of scratch starting the main welding arc, and either or both the welding electrode and work may become contaminated.

Figure 3:
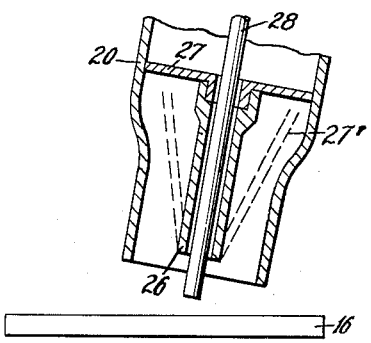
FIGS. 3 and 4 are views similar to FIG. 2 of preferred modifications of the invention.

As disclosed in the Manz Patent No. 3,051,829 "inductive-kick" impulse starting is practical for pilot arc initiation. However, to satisfactorily practice such concept, it is mandatory that the breakdown path of the voltage impulse between the pilot electrode and the welding electrode 28 occur at point proximate to the arcing end of the welding electrode. Obviously when using the external probe 22, FIG. 2, as heretofore mentioned, only one point for arc initiation exists, namely, the arcing end of the pilot electrode 22. In the case of the hollow tubular probe (sleeve) 26 and the single probe, however, it is clear that in the case where the pilot arc electrode forms a parallel conductor with the welding electrode 28 an infinite number of breakdown paths exist. Hence, in order to circumvent this difficulty, it is desirable to dispose pilot arc electrode 36, FIG. 4, at an acute angle relative to the main electrode 28 with the apex of said angle lying proximate to the arcing end of welding electrode 28. Similarly the sleeve 26, FIG. 3 would require a truncated conical section 27 whose form could be generated by revolving electrode 36 axially about welding electrode 28.

Practice has established that both of such structures are valid in that the starting voltage impulse does break down the gap in the desired region. With 2 percent thoriated tungsten, starting was found to be 100 percent.

The following outline sets forth a typical example of the invention for a torch with pilot arc stabilized A.C. for inert gas shielded arc welding.

(1) Torch rating 210 amperes (welding current).
(2) Electrode diameter sizes 0.040 in. to 1/8 in. inclusive.
(3) Cup sizes Nos. 4, 6, and 8 (4/16, 6/16, and 8/16 in diameter inside).
(4) Auxiliary electrode size—0.040 in. diameter.
(5) Auxiliary electrode to welding electrode gap at arc point approximately 0.060 in. when using an 1/8 in. diameter welding electrode.
(6) The gap between the auxiliary electrode mounting and the welding electrode at least 0.110 in. when using a 1/8 in. welding electrode.

(7) The arcing end of the auxiliary electrode positioned to be approximately flush with or inside the end of the gas cup.

(8) It is recommended that a clearance of about 0.040 in. minimum be maintained between the auxiliary electrode and the gas cup in order to provide complete shielding around the auxiliary electrode.

The invention includes the following desirable advantages:

A system wherein the pattern of the cleaning action can be concentrated in a particular direction, or the pattern of cleaning action can be maintained uniform regardless of the inclination or orientation of the welding torch.

No limitation as to the material of the cup, because it is not in circuit relation with the other elements.

The tendency for aspiration, common in prior torches (where the pilot electrode was disposed at approximate right angles to the gas stream), is eliminated and the life of the pilot electrode is greatly increased.

The light of the pilot arc is of sufficient intensity to illuminate the weldment even as seen through the filter glass of a welding helmet; thus, an arc can be struck at a precise point with ease.

Metal cups may be used since the danger of electrode-to-cup-to-work series arcing is appreciably reduced by the elimination of high-frequency as a means of stabilization.

What is claimed is:

1. In a triode inert gas shielded non-consumable electrode alternating current electric arc welding system comprising a torch provided with a cylindrical gas cup and a pilot arc electrode in addition to the main electrode, said cup surrounding said main electrode in concentric relation to provide a cylindrical gas outlet passage, and said pilot arc electrode being carried wholly within the cylindrical gas outlet passage of such cup by said torch with one end spaced from but adjacent to the arc end of said main electrode, means electrically isolating such gas cup from said pilot arc electrode as well as from said main electrode, means for connecting said main electrode and a metal workpiece in an alternating current welding arc energizing circuit, and means for connecting said pilot arc electrode and said main electrode in a pilot arc energizing circuit, the pilot-arc arcing portion of said pilot arc electrode being as close as possible to said main electrode but spaced therefrom whereby undesirable trailing of cleaning action is avoided even when the torch is tilted with respect to the direction of movement of the torch in making a weld bead on the metal workpiece in circuit with such main electrode.

2. In a system as defined by claim 1, a bracket mounted on the inside of said cup, and an annular member constituting said pilot arc electrode carried by said bracket around said main electrode.

3. An inert gas shielded non-consumable electrode arc welding torch for work-in-circuit operation, which comprises an electrically isolated cylindrical gas cup composed of metal surrounding a non-consumable stick electrode in concentric relation to provide an annular gas passage, a pilot arc electrode carried by said torch wholly within the annular gas passage in said cup, and means insulating said pilot arc electrode from said cup, the arc end of said pilot arc electrode being disposed as closely as possible adjacent to but spaced from the welding arc end of said stick electrode to provide a relatively short pilot arc gap therebetween.

4. In an inert gas shielded non-consumable electrode arc welding torch, a cylindrical gas cup provided with an internal bracket having a central opening, a stick electrode extending through such opening, and an annular pilot arc electrode supported by said bracket wholly within said cup in spaced relation to said stick electrode.

5. In an inert gas shielded arc welding torch, a non-consumable stick electrode, a frusto-conical tubular pilot arc electrode surrounding said stick electrode in spaced relation, and a cylindrical gas cup surrounding said pilot arc electrode in concentric relation.

6. In a gas-shielded triode arc welding torch provided with an electrically isolated cylindrical gas cup and an elongated main electrode projecting centrally through such cup, a pilot arc electrode mounted on the torch wholly within said cup in the space between the main electrode and the inner wall of the cup, the body of said pilot arc electrode being inclined toward said main electrode in direction of flow of gas out of the cup, terminating close to but spaced from the main electrode so that the pilot arc is located adjacent to the welding arc end of said main electrode regardless of the orientation of the torch in welding whereby the cleaning action in seam welding work always extends in front as well as behind the weld puddle made with said torch.

References Cited in the file of this patent
UNITED STATES PATENTS

| | | |
|---|---|---|
| 2,516,037 | Williams | July 18, 1950 |
| 2,892,072 | Miller | June 23, 1959 |
| 2,906,854 | Hill et al. | Sept. 29, 1959 |
| 2,951,143 | Anderson et al. | Aug. 30, 1960 |